Sept. 18, 1945.  W. K. ROBBINS  2,385,232
CHAIN LINK
Filed July 5, 1943  2 Sheets-Sheet 1

INVENTOR
WILLIAM K. ROBBINS.
BY Brayton W. Richards
ATTORNEY

Sept. 18, 1945.    W. K. ROBBINS    2,385,232
CHAIN LINK
Filed July 5, 1943    2 Sheets-Sheet 2

INVENTOR
WILLIAM K. ROBBINS.
BY: Brayton Richards
ATTORNEY

Patented Sept. 18, 1945

2,385,232

UNITED STATES PATENT OFFICE 2,385,232

CHAIN LINK

William K. Robbins, Chicago, Ill.

Application July 5, 1943, Serial No. 493,512

6 Claims. (Cl. 59—85)

The invention relates to improvements in chain links and has for its primary object the provision of a chain link formed in separable parts readily attachable to other chain links, and which is of simple construction and highly efficient in use.

Other objects will appear hereinafter.

The invention consists of the combinations and arrangements of parts hereinafter described and claimed.

The invention will be best understood by reference to the accompanying drawings forming a part of this specification and in which—

Figure 1:
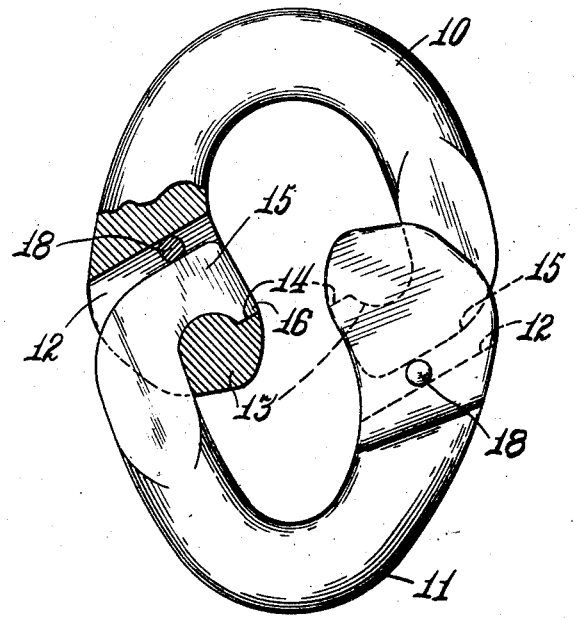
Figure 2:
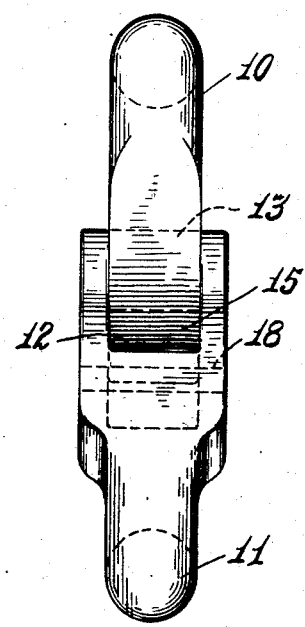
Figure 3:
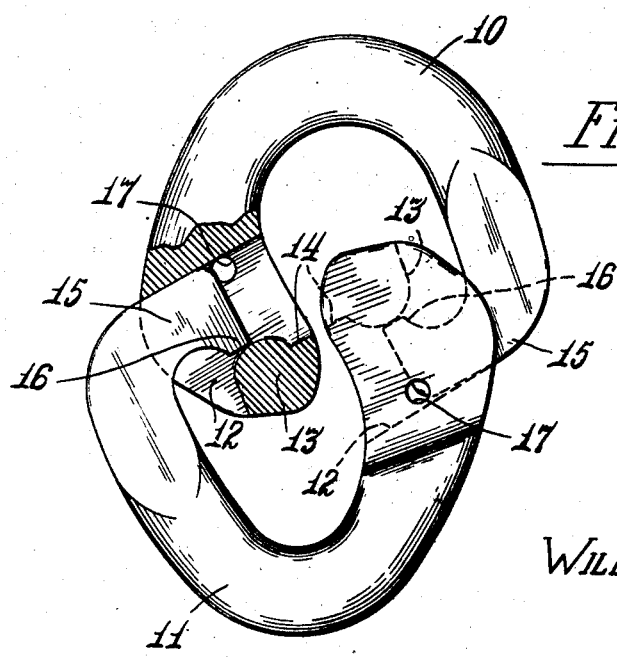
Figure 4:
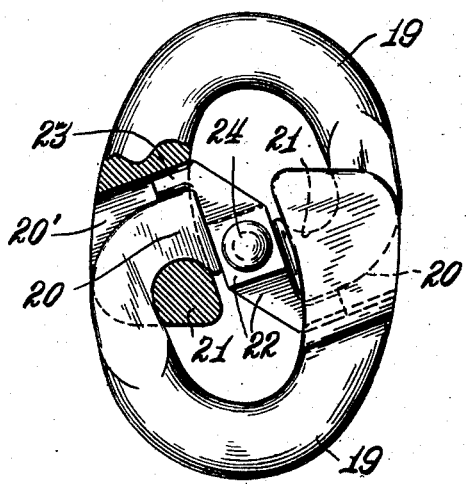
Figure 5:
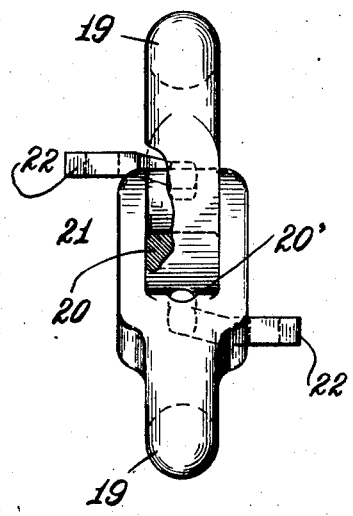
Figure 7:
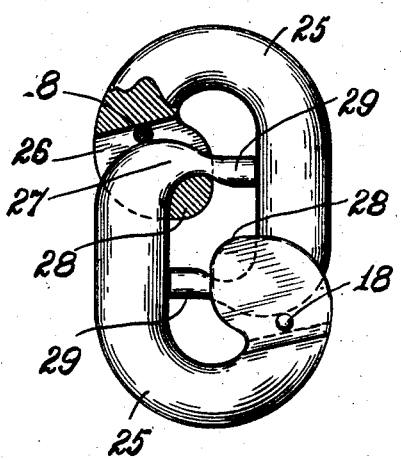
Figure 6:
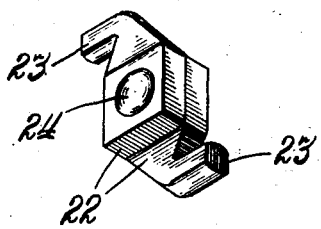

Fig. 1 is a side view, shown partially in section, of a chain link embodying the invention;

Fig. 2, an edge view thereof;

Fig. 3, a view similar to Fig. 1 showing the link parts at one stage of assembly;

Fig. 4, a view similar to Fig. 1 showing a modified form of construction;

Fig. 5, an edge view of the link chain in Fig. 4;

Fig. 6, a perspective view of locking keys employed in the construction shown in Fig. 4; and Fig. 7, a view similar to Fig. 1 but showing another modified form of construction.

The embodiment of the invention illustrated in Figs. 1, 2 and 3 comprises two link halves 10 and 11 which are similar in shape, except that the half 10 is broader than the half 11 so as to form a substantially pear-shaped link when assembled, as shown in Fig. 1, said pear-shape being desirable for use in conjunction with sling chains, as will be readily understood by those skilled in the art.

One end of one limb of each of said link halves is provided with an opening or slot 12 extending from the outer corner of the end of said limb and inwardly and around an anchoring bridge 13, as shown. The opening 12 is provided with a recess 14 at its inner edge, and the other limb of each link half is provided with a hook-like element 15 adapted and arranged to hook around the anchoring element 13, with the nose 16 thereof fitting into the recess 14 as shown. By this arrangement the link halves may be assembled by first being overlapped and then moved toward each other with the hooks 15 fitting into the openings 12, whereupon by combined lateral and reversed longitudinal movements the hooks 15 may be engaged around the anchoring bridges 13, as indicated. Transverse openings 17 are provided as shown for the reception of pins 18 driven therein, said pins thus serving to lock the hooks 15 against reversed movements in their respective openings 12, thus permanently locking the link halves in assembled positions with the elements 13 and 15 in snug and non-rattling engagement with each other.

By this arrangement links may be provided having outer contours of standard link shape and design so as to cooperate fully with such standard links; which can be readily fitted to the small narrow and short types of welded links; which may readily be designed so that its outside width will not exceed the pitch of the chain in conjunction with which it is to be used; in which no strain will be exerted upon the locking pin; in which ample sections may be provided to carry the load without extending the length of the link; in which the central line of strain on the chain closely approaches the point of attachment between the link halves so as to avoid undue strain thereon; and in which the parts may be readily fitted together without the necessity of machining any of them.

In the modification illustrated in Figs. 4, 5 and 6 the link halves 19, the hooks 20, openings 20' and the anchoring bridges 21 are of slightly different shape, and different locking means is provided for securing the parts in assembled condition. This locking means comprises two substantially L-shaped keys 22 having inwardly offset rounded projections 23 insertable in the openings 20', as indicated, to prevent reversed movements of the hooks 20 in the openings 20', as indicated in Fig. 4. The projections 23 are rounded as shown, and the corresponding part of the openings 20' is similarly shaped so as to permit of the insertion of the projections 23 in said openings with the locking keys in planes substantially at right angles to the planes of the link halves as indicated by the full lines in Fig. 5, and then swinging said locking keys inwardly into contact with each other as shown. The locking keys 22 are centrally perforated for the reception of rivets 24 by means of which said locking keys and the link halves may be securely locked in their assembled positions, as will be readily understood. By this arrangement a construction is provided in which the assembled link is reinforced against crushing or inward collapse.

In the modification illustrated in Fig. 7, the link halves 25 are formed with one of their limbs longer than the other, and the openings 26, hooks 27 and anchoring bridges 28 are of somewhat different shapes. Each hook 27 is also provided with an inward extension 29 contacting with the inner side of the opposite link limb, thus reinforcing the same against crushing or inward collapse.

While I have illustrated and described the preferred form of construction for carrying the invention into effect, these are capable of variation and modification without departing from the spirit of the invention. I therefore do not wish to be limited to the precise details disclosed, but desire to avail myself of such variations and modifications as fall within the scope of the appended claims.

I claim:

1. A chain link comprising two substantially U-shaped link halves having an opening extending from the outer corner of the end of one limb thereof and inwardly and around an anchoring bridge, the end of the other limb of said link half being shaped to form a hook insertable into said opening in the other link half and hooked around said bridge by first longitudinal and then combined lateral and reversed longitudinal movements in said opening; and means for locking said hook against reversed movements in said opening and in snug and non-rattling engagement with each other.

2. The construction specified in claim 1 in which said locking means consists of a transverse pin.

3. The construction specified in claim 1 in which said locking means consists of two substantially L-shaped locking keys, each having one end inserted in a link opening and the other end of said keys being secured to each other between the limbs of said link halves.

4. The construction specified in claim 1 in which said locking means consists of two substantially L-shaped locking keys, each having one end inserted in the link opening and the other ends of said keys being secured to each other between and in contact with the limbs of said link halves.

5. The construction specified in claim 1 in which said locking means consists of two substantially L-shaped locking keys, each having one end rounded for insertion and rotation in the link opening, and the other ends of said keys being brought together and secured to each other between the limbs of said link halves.

6. The construction specified in claim 1 in which each hook is provided with an extension bearing against the opposite side of the link.

WILLIAM K. ROBBINS.